June 22, 1954     E. L. MACOICZ     2,681,973
ELECTRIC HEATING APPLIANCE

Filed March 5, 1953

230 VOLTS
1ϕ AC

INVENTOR.
Edward L. Macoicz
BY
Smith, Olsen + Baird
Attys.

Patented June 22, 1954

2,681,973

UNITED STATES PATENT OFFICE 2,681,973

ELECTRIC HEATING APPLIANCE

Edward L. Macoicz, Chicago, Ill., assignor to General Electric Company, a corporation of New York Application March 5, 1953, Serial No. 340,515

4 Claims. (Cl. 219—20)

1

The present invention relates to an electric heating appliance, and more particularly to such an appliance incorporating an electric signaling system for correlating the particular electric heating unit thereof that is supporting a cooking vessel and the particular manually operable selector switch thereof that must be employed to control the heating circuit of the particular electric heating unit.

It is the general object of the present invention to provide in an electric heating appliance, an electric signaling system for the purpose noted that is exceedingly simple in connection and arrangement and that positively eliminates any possibility of shock hazard to the person using the appliance.

Another object of the invention is to provide in an electric range an improved electric signaling system of the character noted that involves no operating elements that must be especially set, adjusted or cleaned by the person using the range.

A further object of the invention is to provide in an electric range, an improved electric signaling system of the character noted that employs a tube or signal lamp of the glow discharge-cold cathode type that has a useful life of many years so that no particular care is required on the part of the user of the range to keep the signaling system in operating order.

Further features of the invention pertain to the particular arrangement of the elements of the electric range, whereby the above-outlined and additional operating features thereof are attained.

Figure 1:
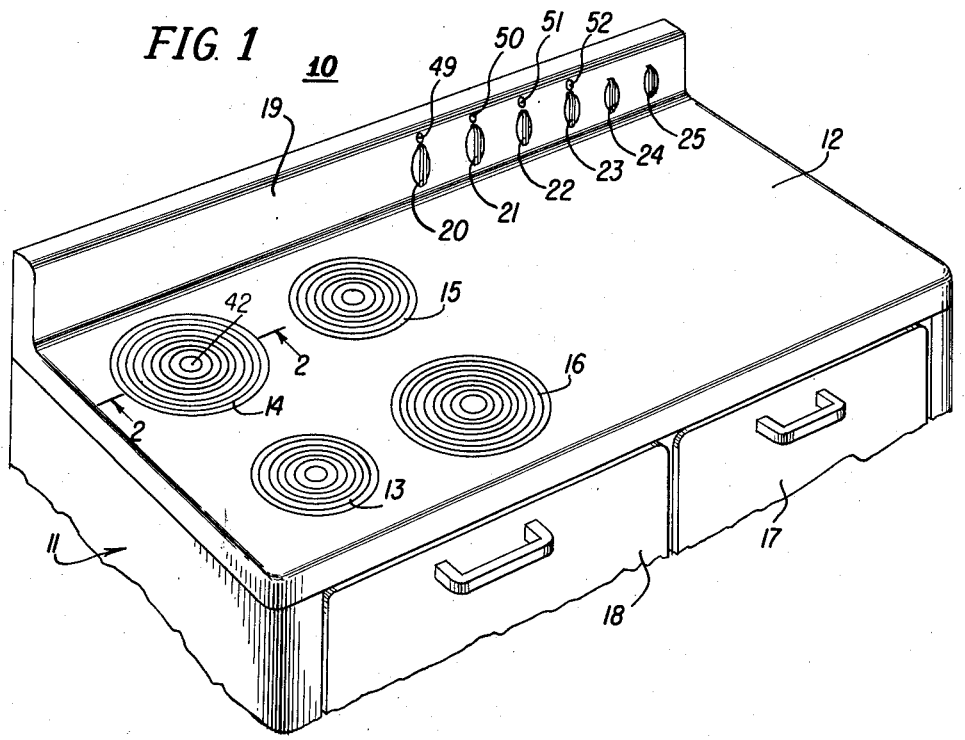
Figure 2:
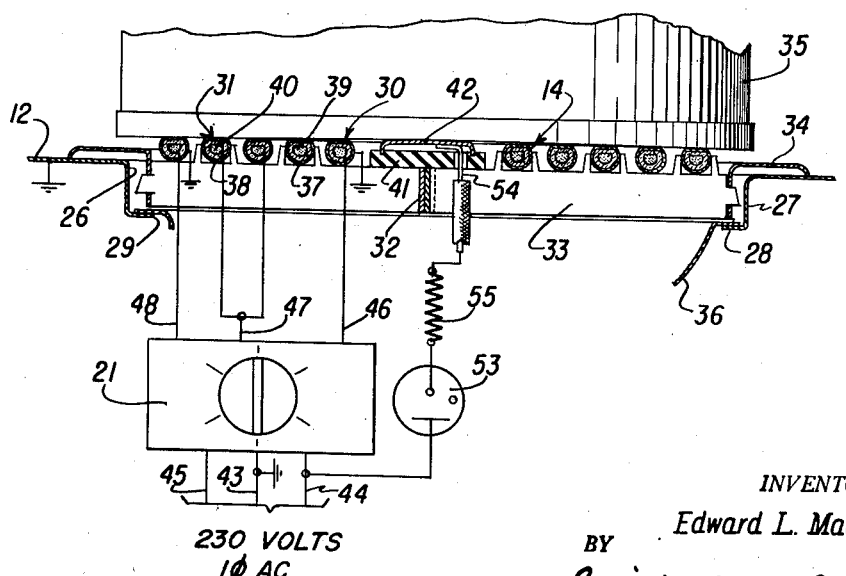

The invention, both as to its organization and method of operation, together with further objects and advantages thereof, will best be understood by reference to the following specification taken in connection with the accompanying drawing, in which:

Figure 1 is a fragmentary front perspective view of the upper portion of an electric range incorporating an electric signaling system and embodying the present invention; and Fig. 2 is an enlarged vertical sectional view of one of the electric heating units incorporated in the electric range, this view being taken in the direction of the arrows along the line 2—2 in Fig. 1, and also an electric circuit diagram of the electric heating system of the one heating unit and of the electric signaling system associated therewith.

Referring now to the drawing, the electric heating appliance 10 there illustrated and embodying the features of the present invention may take the form of an electric range comprising an upstanding body 11 provided with a substantially horizontal cooking top 12 supporting a plurality of surface heating units or hot plates 13, 14, 15 and 16 arranged in spaced-apart relation in a substantially rectangular pattern on the left-hand side thereof. The body 11 houses an oven, not shown, in the right-hand portion thereof and a compartment, not shown, in the left-hand portion thereof, the oven and the compartment being respectively provided with front doors 17 and 18.

The cooking top 12 carries an upstanding backsplash 19 adjacent to the rear thereof, that, in turn, carries a plurality of surface heating unit selector switches 20, 21, 22 and 23, an oven selector switch 24, and an oven temperature regulator or thermostatic switch 25; the elements 20 to 25, inclusive, being arranged in a row on the right-hand side of the backsplash 19. The selector switches 20, 21, 22 and 23 respectively correspond to the surface heating units 13, 14, 15 and 16 and are respectively included in the electric heating circuits thereof. Each of the selector switches 20, etc., may be of the manually operable rotary type disclosed in U. S. Patent No. 2,203,236, granted on June 4, 1940, to Charles P. Randolph and Leslie A. Kempton. This selector switch is of the six-position type including respective "off", "high", "second", "third", "low" and "warm" positions.

As best shown in Fig. 2, the cooking top 12 has a plurality of openings therein that respectively receive the surface heating units 13, 14, etc., the opening receiving the surface heating unit 14, being indicated at 26, and being defined by a downwardly projecting annular flange 27 carried by the cooking top 12 and terminating in an inwardly radially extending ledge 28 having a centrally disposed hole 29 formed therein. The surface heating units 13, 14, etc., may each be fundamentally of the construction disclosed in U. S. Patent No. 2,565,443, granted on August 21, 1951, to Oliver G. Vogel and Francis E. Kirk. Accordingly, the surface heating unit 14 is of the hot plate type including inner and outer helical coil sections 30 and 31; and each of the coil sections 30 and 31 may be of the metal sheath-helical resistance conductor type disclosed in U. S. Patent No. 1,367,341, granted on February 1, 1921, to Charles C. Abbott. The turns of the coil sections 30 and 31 are retained in radially spaced-apart relation by an arrangement including a spider 32 provided with four angularly spaced-apart arms 33, etc., to which the turns of the coil sections 30 and 31 are selectively staked. The spider 32 is pivotally mounted to the cooking top 12 by a suitable hinge mechanism, not shown, that may be of the construction of that disclosed in U. S. patent No. 2,565,432, granted on August 21, 1951, to Francis E. Kirk; whereby the surface heating unit 14, as a whole, may be pivotally moved into and out of the opening 26, in a conventional manner. Finally, the spider 32 is provided with a trim ring 34 that is arranged to cover the top of the opening 26 when the surface heating unit 14 occupies its normal supported position within the opening 26.

Preferably the top surface of the coil sections 30 and 31 are flattened to provide a substantially horizontally disposed composite heating surface adapted to engage and to support the bottom wall of a cooking vessel, or the like, indicated at 35; and a drip pan 36 is arranged in the opening 29 below the surface heating unit 14, in the usual manner. As illustrated, the metal sheath of the inner coil section 30 is indicated at 37, and the metal sheath of the outer coil section 31 is indicated at 38; while the helical resistance conductor of the coil section 30 is indicated at 39, and the helical resistance conductor of the outer coil section 31 is indicated at 40. The helical resistance conductor 39 is suitably embedded in an electric-insulating and heat-conducting material within the enclosed sheath 37; and likewise the helical resistance conductor 40 is suitably embedded in an electric-insulating and heat-conducting material within the enclosing sheath 38. Also the inner coil section 30 has a centrally disposed opening therein in which an insulator 41 is arranged, the insulator 41 carrying a metal electrode or button 42 disposed substantially in the plane of the composite heating surface provided by the flattened tops of the sheaths 37 and 38; whereby the bottom of the cooking vessel 35, when it is in its supported position, not only engages the flattened tops of the sheaths 37 and 38 but it also engages the top of the button 42 establishing a bridge connection therebetween.

The electric range 10 is provided with a source of electric current supply of the three-wire Edison type of 230-volts, single-phase, A. C., including a grounded neutral line conductor 43 and two outside ungrounded line conductors 44 and 45. The source of power supply extends commonly to the selector switches 20 to 24, inclusive, so that the heating circuits of the four surface heating units 13, 14, etc., and of the oven may be selectively controlled. As illustrated in Fig. 2, the selector switch 21 is arranged to control the heating circuit of the surface heating unit 14 and comprises three input terminals respectively connected to the three line conductors 43, 44 and 45, and three output terminals respectively connected to three conductors 46, 47 and 48. The conductor 46 is connected to one terminal of the helical resistance conductor 39; the conductor 47 is commonly connected to the other terminal of the helical resistance conductor 39 and to one terminal of the helical resistance conductor 40; and the conductor 48 is connected to the other terminal of the helical resistance conductor 40. In the arrangement the sheaths 37 and 38 and the cooking top 12 are commonly connected by the ground connections illustrated to the grounded neutral line conductor 43 so that in no case is there any potential between ground and the cooking top 12 or between the cooking top 12 and the sheaths 37 and 38. The selector switch 21 is operative from its "off" position, opening the heating circuit to the coil sections 30 and 31, into five different control positions, closing the heating circuit to the coil sections 30 and 31. In the different control positions of the selector switch 21 the coil sections 30 and 31 are variously connected alone and in parallel and in series relationship to various pairs of the line conductors 43, 44 and 45 to provide the five different heats, in the usual manner.

Turning now to the electric signaling system that is incorporated in the range 10, a plurality of glow discharge-cold cathode tubes or lamps, preferably of the neon gas-filled type, such, for example, as type NE-48, ¼ watt, are housed in the backsplash 19 and respectively associated with a corresponding plurality of holes formed therein and respectively positioned adjacent to the selector switches 20 to 23, inclusive. As illustrated in Fig. 1, the holes 49, 50, 51 and 52 are respectively arranged adjacent the tops of the turn buttons of the respective selector switches 20, 21, 22 and 23; and the neon lamps mentioned are housed within the backsplash 19 respectively behind the holes 49, 50, etc. Specifically, as illustrated in Fig. 2, the neon lamp disposed behind the hole 50 operatively associated with the turn button of the selector switch 21 is illustrated at 53.

The button 42 is electrically connected to an insulated conductor 54, that, in turn, is connected to one terminal of a current limiting resistor 55, of about 500,000 ohms, the other terminal of the resistor 55 being connected to one electrode of the lamp 53; and the other electrode of the lamp 53 is directly connected to the ungrounded line conductor 44. Thus it will be understood that the circuit for operating the tube 53 includes in series relation the grounded neutral line conductor 43, the ground connection from the grounded neutral line conductor 43 to the sheaths 37 and 38, the sheaths 37 and 38, the bridge connection including the bottom of the metal cooking vessel 35 between the sheaths 37 and 38 and the button 42, the button 42, the conductor 54, the current limiting resistor 55, and the ungrounded line conductor 44. Moreover, this operating circuit for the tube 53 is independent of the position of the selector switch 21.

Considering now the mode of operation of the electric signaling system, it will be understood that when the cooking vessel 35 is removed from the surface heating unit 14 the bridge connection between the sheaths 37 and 38 and the button 42 is interrupted so that the operating circuit for the tube 53 is interrupted; whereby the tube 53 is rendered non-conductive so that the resistor 55, the conductor 54 and the button 42 are isolated with respect to the ungrounded line conductor 44. Accordingly, at this time there is no potential between the button 42 and the grounded sheaths 37 and 38, thereby preventing any possibility of shock hazard to the person using the electric range 10. Now when a cooking operation is to be carried out the food to be cooked is placed in the cooking vessel 35; and the cooking vessel 35 is placed in supported position upon the surface heating unit 14; whereby the bridge connection between the grounded sheaths 37 and 38 and the button 42 is completed, the cooking vessel 35 being of the metal type or at least having a metal bottom. When this bridge connection is thus completed, the full voltage between the line conductors 43 and 44 is applied across the electrodes of the tube 53; whereby the tube 53 is ignited and rendered conductive producing a glow that is visible through the hole 50 in the backsplash 19 in order to correlate the selector switch 21 with the supported position of the cooking vessel 35 upon the surface heating unit 14. More particularly, the glow of the tube 53 in the hole 50 indicates to the person using the range 10 that the selector switch 21, and not the selector switches 20, etc., should be manipulated for the purpose of selectively setting the heat of the surface heating unit 14 supporting the cooking vessel 35. This arrangement positively coordinates the surface heating unit 14, the selector switch 21 that controls the surface heating unit 14, and the supported position of the cooking vessel 35 upon the surface heating unit 14, thereby eliminating any possibility of the manipulation of the wrong one of the selector switches 20, etc. Of course, this arrangement prevents the erroneous completion of the heating circuits of the other heating elements 13, etc., by the improper manipulation of the corresponding selector switches 20, etc.

When the tube 53 is rendered conductive, the current in the above-traced series circuit traversing the current limiting resistor 55 produces a substantial voltage drop thereacross, since the resistor 55 is of relatively high resistance; whereby there is no possibility of shock hazard, since the remaining voltage drops in the circuit are below the threshold of feeling. Specifically, the small voltage drop across the bridge connection between the button 42 and the grounded sheaths 37 and 38 is well below the threshold of feeling, about 12 volts, so that there is no danger of shock to the person using the range by virtue of any small voltage drop through the bottom of the cooking vessel 35. As previously noted, the circuit for operating the tube 53 is independent of the position of the selector switch 21; however, subsequently, when the cooking vessel 35 is removed from the surface heating unit 14, the operating circuit for the tube 53 is again interrupted so that the tube 53 is again rendered non-conductive in order that the resistor 55, the conductor 54 and the button 42 are again isolated with respect to the voltage upon the ungrounded line conductor 44.

In view of the foregoing, it is apparent that there has been provided in an electric range, an electric signaling system for correlating the supported position of a metal cooking vessel upon any one of the surface heating units of the range with respect to the selector switch that must be employed for the purpose of controlling the heating circuit of the one surface heating unit; which electric signaling system is of simple connection and arrangement and involves no elements that have to be especially adjusted, set or cleaned by the person using the range.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an electric heating appliance including an electric heating unit of the metal sheath-resistance conductor type, said sheath being arranged in helical form to define a substantially flat heating surface provided with a center opening and adapted removably to support a metal vessel in direct contact and in heat exchange relation therewith, a source of electric current provided with a grounded terminal and an ungrounded terminal, a ground connection between said sheath and said grounded terminal, and a manually operable switch selectively operative to connect said resistance conductor to said source in order to effect heating of said sheath; the combination comprising a metal button disposed in said center opening and operatively associated with said sheath and electrically insulated therefrom, the top of said button being disposed substantially in the plane of said flat heating surface and engaged by the metal vessel supported upon said sheath in order to establish therethrough a bridge connection between said sheath and said button, a glow discharge-cold cathode tube operatively associated with said switch, a current limiting resistor, and a circuit for operating said tube across said terminals and including in series relation said ground connection and said sheath and said bridge connection and said button and said resistor, whereby said tube is rendered conductive and non-conductive respectively in response to placement and removal of the metal vessel with respect to said sheath, the glow of said tube incident to conduction thereof serving as a signal correlating said switch and said heating unit with the supported position of the metal vessel, said tube incident to non-conduction thereof isolating said button from the potential of said ungrounded terminal to prevent shock-hazard between said sheath and said button, said resistor having a sufficiently high resistance to reduce below the threshold of feeling the voltage-drop between said sheath and said button incident to conduction of said tube.

2. In an electric range including a cooking top terminating adjacent to the rear thereof in a backsplash, an electric heating unit of the metal sheath-resistance conductor type supported in an opening provided in said cooking top, said sheath being adapted removably to support a metal vessel in direct contact and in heat exchange relation therewith, a source of electric current provided with a grounded terminal and an ungrounded terminal, a ground connection between said cooking top and said sheath and said grounded terminal, and a manually operable switch carried by said backsplash and selectively operative to connect said resistance conductor to said source in order to effect heating of said sheath; the combination comprising a metal electrode carried by said cooking top and operatively associated with said sheath and electrically insulted from both said cooking top and said sheath, said electrode being engaged by the metal vessel supported upon said sheath in order to establish therethrough a bridge connection between said sheath and said electrode, a glow discharge-cold cathode tube carried by said backsplash adjacent to said switch, a current limiting resistor, and a circuit for operating said tube across said terminals and including in series relation said ground connection and said sheath and said bridge connection and said electrode and said resistor, whereby said tube is rendered conductive and non-conductive respectively in response to placement and removal of the metal vessel with respect to said sheath, the glow of said tube incident to conduction thereof serving as a signal correlating said switch and said heating unit with the supported position of the metal vessel, said tube incident to non-conduction thereof isolating said electrode from the potential of said ungrounded terminal to prevent shock-hazard between said sheath and said electrode, said resistor having a sufficiently high resistance to reduce below the threshold of feeling the voltage-drop between said sheath and said electrode incident to conduction of said tube.

3. The electric range combination set forth in claim 2, wherein said tube is mounted behind the front of said backsplash adjacent to a hole therein disposed adjacent to said switch so that the glow of said tube incident to conduction thereof is visible through said hole from the front of said backsplash.

4. The electric heating appliance combination set forth in claim 1, wherein said tube is of the neon gas-filled type.

References Cited in the file of this patent

UNITED STATES PATENTS

| Number | Name | Date |
| --- | --- | --- |
| 2,070,491 | Park | Feb. 9, 1937 |
| 2,240,340 | Mills et al. | Apr. 29, 1941 |
| 2,392,077 | Wilson | Jan. 1, 1946 |
| 2,405,984 | Sharpe | Aug. 20, 1946 |